July 25, 1944.  O. SWARTZ  2,354,622

DECORATIVE PLAQUE

Filed Oct. 30, 1941   2 Sheets-Sheet 1

INVENTOR.
OTTO SWARTZ
BY Joseph J. Julian
Attorney

July 25, 1944.    O. SWARTZ    2,354,622
DECORATIVE PLAQUE
Filed Oct. 30, 1941    2 Sheets-Sheet 2

INVENTOR.
OTTO SWARTZ.
BY

Patented July 25, 1944

2,354,622

UNITED STATES PATENT OFFICE 2,354,622

DECORATIVE PLAQUE

Otto Swartz, Toledo, Ohio

Application October 30, 1941, Serial No. 417,172

5 Claims. (Cl. 40—160)

This invention relates generally to wall plaques and more particularly to wall plaques in which certain several parts thereof are readily assembled and disassembled.

Decorative wall plaques have long had an important place both in the schemes of interior decoration of homes, offices and other rooms, and also in the field of window display. Wall plaques which have a considerable aesthetic appeal are those in which the plaque is of substantial size in both length, width and thickness so that a three dimensional effect upon the viewer is produced. Also, such plaques have had considerable sale and distribution when the base member thereof, that is to say, the large element adjacent the wall, has been composed of glass or mirror in the form of silvered glass. Thus by reason of the relative bulk and fragility of the plaques, they have required expensive and bulky packing resulting in an increased cost for storage and transportation as well as an increased cost to make up for the loss due to breakage.

While wall plaques may be used as such, as a unitary decorative medium or device, such plaques may form a constructional component of other practical objects or devices such as match boxes, ornamental lights, containers for small miscellaneous items such as pins etc. By the use of the general constructional details disclosed herein, an improvement in the fabrication of such devices may be had. Furthermore, ash trays, as for example, such as the type often employed on automobiles or those having a suction cup may utilize certain of the features of the present invention.

A disadvantage of prior art constructions of wall plaques in which a relatively rigid decorative element is combined with a relatively fragile base lies in the fact that in securing the decorative element to the base, the base is placed under stress of such a nature that shocks or changes in temperature frequently result in the breakage of the base.

Another disadvantage in prior art constructions lies in the fact that where the design includes parts having a symmetrical nature, the parts are not adjustable in position or renewable with relation to each other so that new and interesting effects may be retained.

It is, therefore, an object of the present invention to provide novel decorative plaque structure wherein the foregoing disadvantages are overcome and a new and useful article of manufacture is produced.

In accordance with the present invention the decorative element is adjustable in position with relation to the base upon which it is mounted and is also removable therefrom and replaceable thereon for the purpose of storing, packing and shipping, as well as for the purpose of changing for an altered decorative effect combination of a particular decorative element with a base.

Another object herein lies in the provision of structure of the class described wherein all of the adjustments or integration or disassembly of the parts may be accomplished without special tools or skill.

These objects and other incidental ends and advantages will more fully appear in the progress of this disclosure and be pointed out in the appended claims.

In the drawings similar reference characters designate corresponding parts throughout the several views of each embodiment and in which.

Turning now to the first embodiment of the invention illustrated in Figures 1, 2, 3, 4, 7 and 8 the device generally indicated by numeral 10 comprises broadly a decorative element 11 and a base 12.

Figure 1:
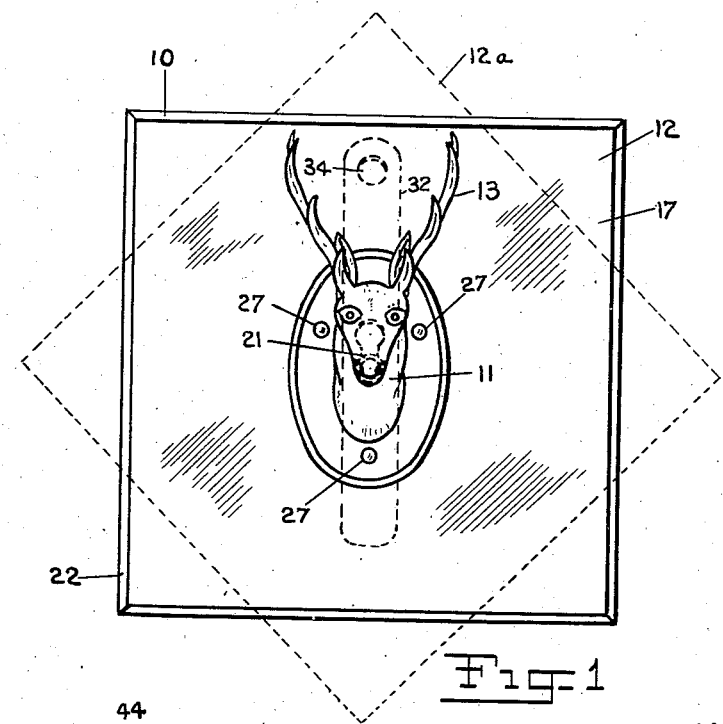
Figure 1 is a front elevational view of a decorative wall plaque constituting a first embodiment of the invention.
Figure 2:
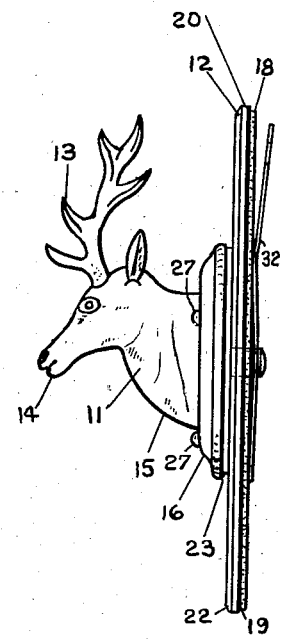
Figure 2 is a side elevational view of Figure 1 as seen from the right side thereof.
Figures 3, 4:
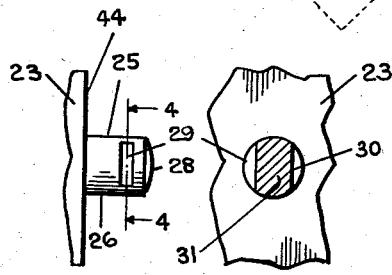
Figure 3 is a fragmentary enlarged side elevational view showing the rear portion or male element of a decorative wall plaque as seen generally from the same plane as Figure 2 with adjacent parts removed for the purpose of clarity.
Figure 4 is a fragmentary sectional view partly in elevation, as seen from the plane 4—4 on Figure 3.
Figures 5, 6:
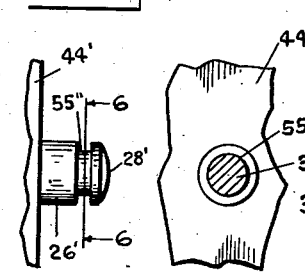
Figure 5 is a fragmentary enlarged side elevational view showing the rear portion or male element of a decorative wall plaque as seen from the same plane as Figure 4 with adjacent parts removed for purposes of clarity.
Figure 6 is a sectional view as seen from the plane 6—6 on Figure 5.

The decorative element 11 may take any suitable form running the entire gamut of aesthetic requirement. As shown in Figure 1, the decorative element takes the form of a deer head including the antlers 13, the head 14 and the neck or body portion 15. Extending outwardly from the rear portion of the neck 15 and preferably integral therewith is a flange 16.

While mahogany wood and other opaque materials are often used as the base of plaques, the base 12 is preferably composed of a sheet of glass or other transparent material having a silvered layer 20 on the rear surface 19 thereof so that the base when viewed from the front surface 17 acts as a mirror. The base 12 is provided with a protective layer 18 on the rear surface 19 thereof, that is, rearwardly of the silvered layer 20. The protective layer 18 may be of any suitable material such as felt or cloth preferably adhesively secured in place. At a suitable point on the base, preferably in the center thereof, the base 12 is provided with an orifice 21 which extends through the base as well as the other layers 20 and 18.

While shown in the form of a square, the base 12 may have any desired external configuration and may be provided with a bevel 22 or not, as desired. It is necessary, however, that the front surface 17 of the base 12 be planar within a circular area extending radially outward from the orifice 21 for a distance equal to the greatest extent of the auxiliary plate 23 or the flange 16, for a purpose as will be more particularly described hereinbelow.

The decorative element 11 is detachably and adjustably connectable with the base 12 through the use of the mounting means generally indicated by numeral 25. The mounting means includes broadly a male element 26 which is integral with and projects rearwardly from the auxiliary plate 23 and a female combination hanger and retainer element 32. The plate 23 is preferably of substantially the same area and configuration of the flange 16 and is permanently secured thereto in any suitable manner by means of the rivets 27.

While shown as a support plate, the auxiliary plate 23 may, of course, be fabricated integrally with the flange 16 and obviously other means equivalent to the rivets 27 may be used to fasten the auxiliary plate 23 to the flange 16, as for example, screws which would extend forwardly from the auxiliary plate 23 into the flange 16 to form a concealed attachment. The flange 16 is in reality the rearmost part of the body portion 15 and where the design of the decorative element 11 is different, the rear part of the body portion 15 of such other substituted decorative element may be attached to the plate 23 or may be integral therewith.

The male element 26 is preferably cylindrical in form having a circular cross section and adjacent the rear end 28 thereof is provided with a pair of oppositely disposed channels 29 and 30. The inner-opposed bottom surface of the channels 29 and 30 are preferably rectilinear forming between them the combination hanger and retainer engaging portion 31.

Figures 7, 8:
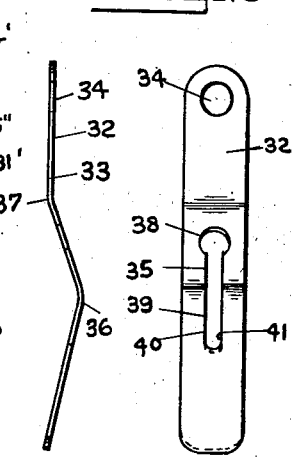
Figure 7 is a side elevational view, taken from a plane similar to Figure 2 of the combination hanger and retainer element in the first embodiment of the invention.
Figure 8 is a side elevational view of Figure 7 as seen from the right side thereof.
Figures 9, 10:
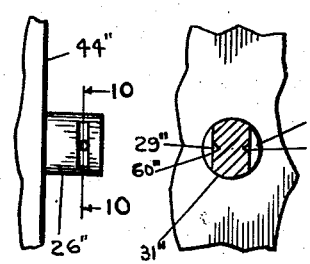
Figure 9 is a fragmentary side elevational view showing rear portion or male element of a decorative plaque as seen from the same plane as Figure 16 with adjacent parts removed for purposes of clarity.
Figure 10 is a fragmentary sectional view as seen from the plane 10—10 on Figure 9.

The combination hanger and retainer element 32 is best seen in Figures 7 and 8 and is in the form of an elongated body 33 having a hanging orifice 34 and a male element engaging slot 35. The hanger and retainer element 32 is preferably composed of resilient material such as spring brass or a resilient plastic and is of a regular shape having the opposed bends—lower bend 36, upper bend 37, best seen in Figure 7. It is to be noted that the configuration of the combination hanger and retainer element shown in Figure 7 is that taken by it in its normal or unstressed condition. The male element engaging slot 35 includes a rounded entrance 38 and a lower portion 39 having spaced and parallel side edges 40 and 41. The spacing between the side edges 40 and 41 is substantially equal to or slightly greater than the width of the combination hanger and retainer engaging portion 31, that is to say, the distance between the bottoms of the channels 29 and 30. The diameter of the circular portions which forms the rounded entrance 38 is substantially equal to or slightly greater than the greatest effective diameter of the male element 26.

The distance between the channels 29 and 30 and the rear surface 44 of the auxiliary plate 23 is slightly greater than the combined thickness of the base 12, the silvered layer 20, the protective layer 18 and the hanger and retainer element 32.

The assembly of the device is substantially as follows. The decorative element having integrated therewith the male element 26, as previously described, is positioned so that the male element 26 may be inserted into the orifice 21, the rear surface 44 contacting the surface 17 and the base 12. The hanger and retainer element 32 is placed against the rear surface of the layer 18 with the bend 36 presenting the convex portion thereof rearwardly or away from the said layer 18. The end 28 of the male element 26 is inserted into the entrance 38 and the bend 36 is simultaneously given manual pressure toward the base 12. When the bend 36 is substantially flattened out, the element 32 is moved upwardly, as viewed in Figures 2 and 7 and the edges 40 and 41 of the lower portion 39 of the slot 35 will slide into and engage the channels 29 and 30, the male element 26 being pushed all the way down to the lowermost portion of the slot 35.

Since the element 32 is in a flattened stressed condition, it exerts a resilient pull upon the male element 26, keeping the parts in operating condition under resilient pressure or tension, as the case may be. The element 32 is thus thermo-controlled and being responsive to changes in temperature and thereby prevents breakage of parts due to changes in temperature. By reason of the bend 37, when the bend 36 is flattened, the upper portion of the hanger and retainer element 32 is deflected rearwardly so that the orifice 34 is spaced from the protective layer 18 so that a suitable male or other hook-like element (not shown) may be used to hang the whole device 10 upon a wall or other vertical surface. In this manner the head or hooked portion of such hanging device (not shown) may be disposed between the forward surface of the upper portion of the element 32 and the upper portion of the rear surface of the protective layer 18.

By reason of the cooperation of the edges 40 and 41 with the channels 29 and 30 respectively, the element 32 and the decorative element 11 are in keyed relation to each other so that they may be rotated as a unit about an axis concentric with the orifice 21 in the base 12.

Thus by the rotation of the element 32 and the decorative element 11 as a unit with relation to the base 12, through, for example, 45°, a different artistic effect may be obtained, as, for example, that illustrated in Figure 1 by the dotted outline of the base, indicated by numeral 12a.

It may be noted at this point that should the element 32 lose any of its resiliency, there is no danger of the parts separating because the male element 26 is constantly urged downwardly by the pull of gravity and in the present construction, regardless of the position of the base, the hanger and decorative element maintain this cooperative position so that the decorative element is always suspended by a downward pull upon the element 32.

Since the male element 26 is maintained in a secured position by the resilient action of the lower portion of the hanger and retainer element 32, if desired, the decorative element 11 may be disengaged from the hanger and retainer element 32 and an entirely different base substituted for the base 12. The only constructional requirements of the substituted base are that the same be provided with an orifice of approximately the same size or larger than the male element 26 and that the combined thickness of the base together with any protective or other layers thereon be not in excess of the distance between the rear surface 44 and the slots 29 and 30. Since any undesired play will be taken up by the resilient action of the hanger element 32, only very broad commercial tolerances need be used in the fabrication of the various bases corresponding to the base 12.

Turning now to the second embodiment of the invention best seen in Figures 5, 6, 13 and 14, for the purpose of avoiding needless repetition, parts corresponding to the first embodiment are given singly primed reference characters.

The decorative element 11' is in the form of a crucifix 50' having a fount 51'. These two parts are preferably fabricated as a unit with the male element 26' integral with the rear wall 44' of the crucifix 50'. In other words, as contrasted with the first embodiment of the invention, the flange structure 16 is omitted.

The base 12' has an abnormal octagonal peripheral configuration. The male element 26' of the second embodiment differs in construction from the first embodiment of the invention in that the slots 29' and 30' of the first embodiment have substituted therefor an annular groove 52'.

Figure 14:
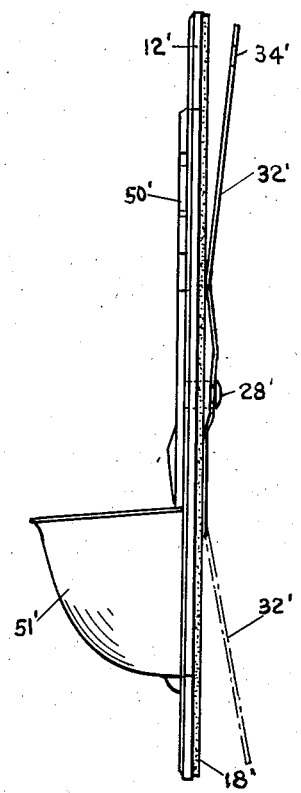
Figure 14 is a side elevational view of Figure 13.
Figure 15:
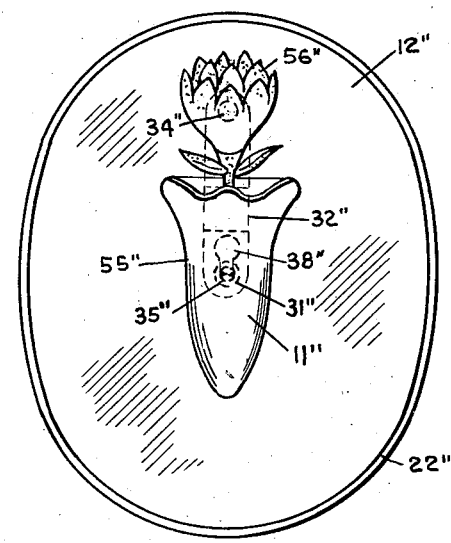
Figure 15 is a front elevational view taken similarly to Figure 13 but shows a third embodiment of the invention.
Figure 16:
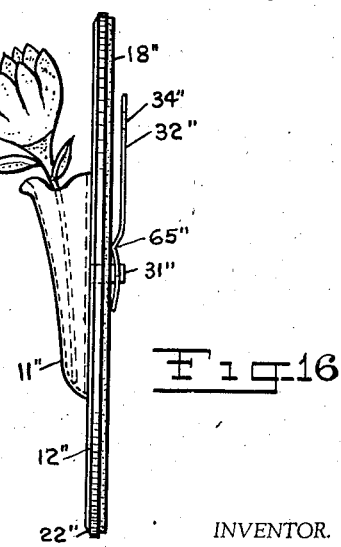
Figure 16 is a side elevational view of Figure 15.

The operation of the second embodiment of the invention is in many respects similar to the first embodiment with the exception that the hanger and retainer element 32' is independently rotatable with relation to the decorative element 11', thus where desired, the retainer and hanger element 32' may be rotated through 180° from the position shown in Figure 14 and pulled slightly back so that the same may act as a stand, thus the plaque 10' may be used as a table or other similar horizontal surface decoration. The altered or adjusted position of the hanger and retainer element 32' is indicated by dot-dash lines in Figure 14.

Turning now to the third embodiment of the invention illustrated in Figures 9 to 12, inclusive, and 15 and 16, for the purpose of avoiding needless repetition, parts corresponding to the first embodiment of the invention are given similar reference characters doubly primed.

The decorative element 11'' is in the form of a vase 55'' having thereon a flower 56''. The base 12'' is oval in shape and is in other respects similar to the other described bases. The male element 26'' in addition to having the slots 29'' and 30'' is also provided in the hanger and retainer engaging portion 31'' thereof with a pair of oppositely disposed indentations 60'' and 61'' located in the opposed lower or inner surfaces of the slots 29'' and 30'' respectively.

The hanger and retainer element 32'' has the lower portion thereof shortened as compared with the prior described embodiments and the side edges 40'' and 41'' of the slot 35'' are provided with oppositely disposed inwardly directed projections 62'' and 63'' respectively.

Figures 11, 12:
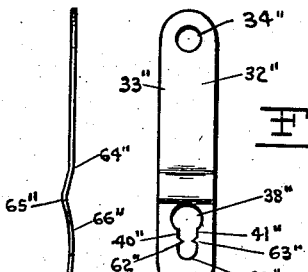
Figure 11 is a side elevational view, taken from the plane similar to Figure 2 of the combination hanger and retainer element in the third embodiment of the invention.
Figure 12 is a side elevational view of Figure 11 as seen from the right side thereof.
Figure 13:
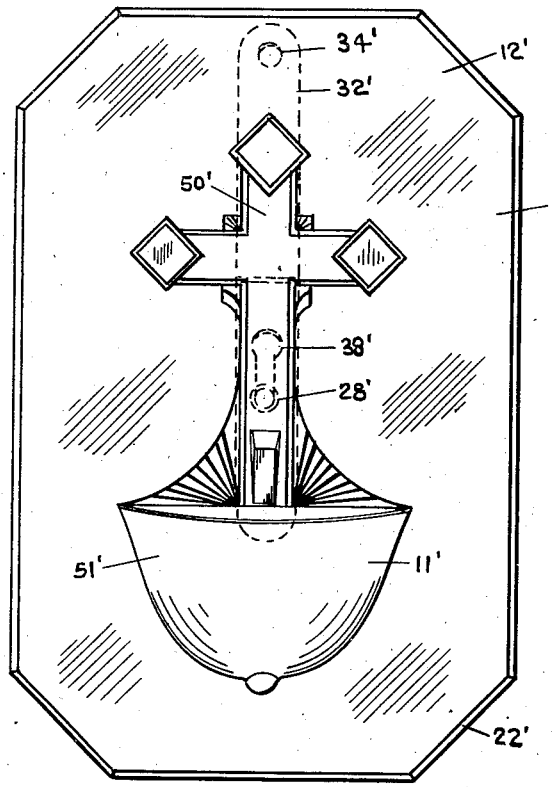
Figure 13 is a front elevational view corresponding to Figure 1, but shows a second embodiment of the invention.

As best seen in Figure 11, the hanger and retainer element 32'' includes an upper bend 64'', a lower bend 65'' and a curved portion 66''. When the decorative element 11'' integral with the male element 26'' is assembled upon a base 12'', the male element 26'' is inserted through a suitable orifice in the base 12''. The male element is inserted within the round opening 38'' and the curved portion 66'' is pushed forwardly to flatten the same at the same time the male element 26'' is pushed down or the hanger and retainer element is pulled up until the projections 62'' and 63'' snap into the oppositely disposed indentations 60'' and 61''. By reason of the shape of the curved portion 66'', since the hanger and retainer element is composed of resilient material, the said curved portion 66'' in attempting to return to its normal condition resiliently maintains the decorative element in operative connection with the hanger and retainer element, which parts are capable of rotation, similar to that described in connection with the first embodiment. Furthermore with the flattening of the curved portion 66'' the lower bend 65'' of the upper bend 64'' causes the upper portion of the body 33'' to be disposed rearwardly at an angle with relation to the rear surface of the base 12'' for hanging purposes.

In the third embodiment of the invention it will be noted that not only are the action of gravity and the resilient action of the curved portion 66'' together with the slot 35'' used for securing the parts together, but also a positive locking action is obtained by means of the projections 62'' and 63''.

It may thus be seen that I have disclosed the construction of novel decorative wall plaques. Wall plaques constructed in accordance with the various embodiments disclosed are capable of being altered to produce novel decorative effects, such alterations including the changing in combination between bases and decorative elements both as to kind and relative position. The parts are easily assembled and disassembled so that substantial savings may be made as a result of lower storage and shipping costs. Furthermore, in the use of relatively fragile materials savings are made because less breakage occurs when the parts are separately packed. By reason of the relatively simple construction of the parts, the same may be fabricated at low cost and have a consequent wide sale and distribution. Adjustments may be made without any special skill or tools.

I wish it to be understood that I do not desire to be limited to the exact details of construction shown and described for obvious modifications will occur to a person skilled in the art.

I claim:

1. A decorative plaque comprising: a decorative element; a base; a hanger and retainer element; and means fixedly connecting the decorative element and the hanger retainer element, said means penetrating said base, whereby the hanger retainer element and the decorative element may be rotated as a unit independently with relation to the base.

2. A decorative plaque comprising: a decorative element; a base; a hanger and retainer element; and means rotatably connecting the decorative elements and the hanger retainer element with relation to each other and the base, said means extending through said base.

3. A decorative plaque comprising: a decorative element; a base having an orifice; a hanger and retainer element; and means to detachably attach the decorative element to the hanger and retainer element, said means penetrating the base through said orifice whereby the decorative element and the hanger retainer element are disposed on opposite sides of the base.

4. A decorative plaque comprising: a decorative element; a base having an orifice; a hanger and retainer element; and means to detachably attach the decorative element to the hanger and retainer element, said means penetrating the base through said orifice whereby the decorative element and the hanger retainer element are disposed on opposite sides of the base; the hanger and retainer element being radially rotated downward through 180° and alignable in position relative to the base of the plaque providing an easel support.

5. A decorative plaque comprising: a decorative element; a base having an orifice; a resilient hanger and retainer element; and means to detachably attach the decorative element to the hanger and retainer element, said means penetrating the base through said orifice whereby the decorative element and the hanger retainer element are disposed on opposite sides of the base; said retainer element as engaged by said means being in an arched position whereby the same may change in shape when the parts are expanded or contracted by changes of temperature or atmospheric conditions.

OTTO SWARTZ.